Patented June 13, 1944

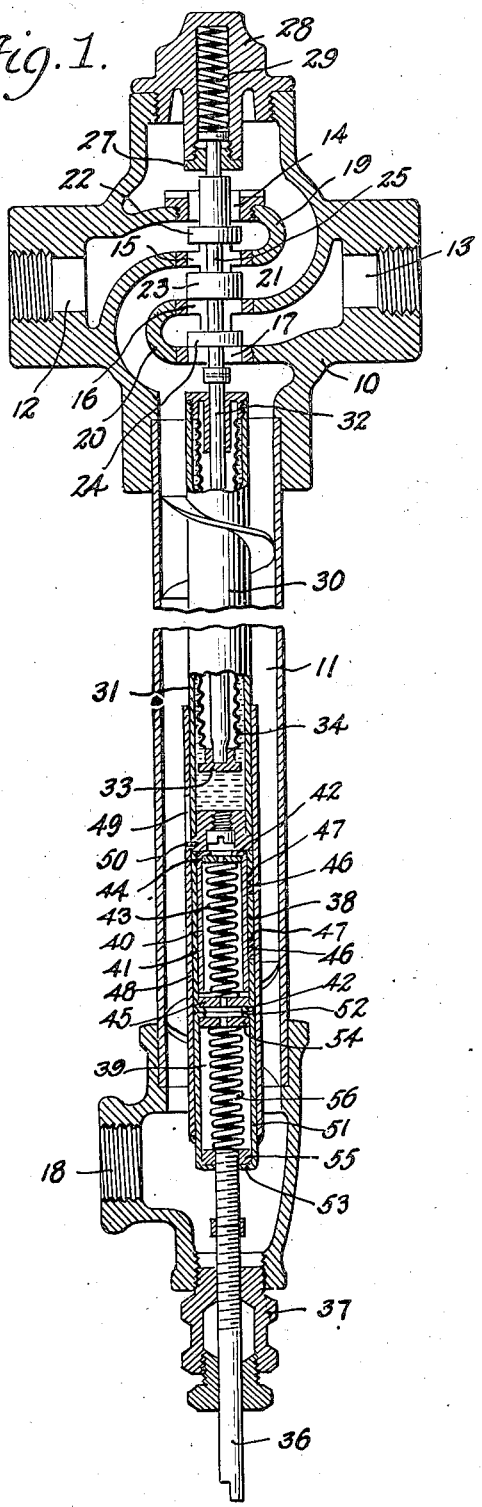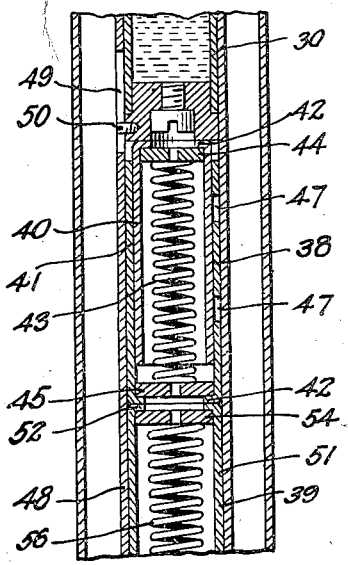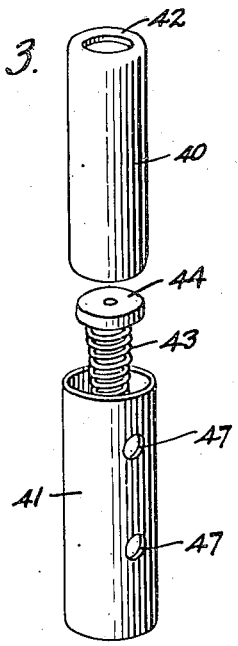

2,351,086

UNITED STATES PATENT OFFICE 2,351,086

THERMOSTATICALLY CONTROLLED DEVICE

Herbert J. C. Wells, Atlantic Highlands, N. J.

Application December 11, 1942, Serial No. 468,644

5 Claims. (Cl. 236—12)

This invention relates to devices for controlling the temperature of a hot water supply to heating units, tanks, bathrooms or the like and the invention has particular reference to control devices of said character provided with a safety means functioning to automatically shut off the hot water supply in the event the same reaches a dangerous temperature.

The invention comprehends a thermostatically controlled valve for automatically regulating the admission of steam and water or water of different temperatures to a mixing chamber and the blending or mixing of the same therein to provide a hot water supply of a predetermined temperature together with a safety means therefor which functions to shut off the supply of the hotter medium to the mixing chamber in the event that the mixed water therein reaches a dangerous temperature due to the failure of the thermostat to properly function.

More specifically the invention resides in a control device of said character provided with a safety device located in the mixing chamber thereof and engaging the inner end of the thermostat and which consists of telescopically associated sections fused together in fixed relation and under tension so that when released by the melting of the fusible connection the sections will be moved outwardly relative to each other to thereby force the thermostat towards the valve ports, thus functioning to effect the closing of the hot water or steam supply to the mixing chamber.

With the foregoing and other objects in view, reference is now made to the following specification and accompanying drawing in which there is disclosed the preferred embodiment of the invention.

Fig. 1 is a vertical sectional view through a control device equipped with a safety means constructed in accordance with the invention.

Fig. 2 is an enlarged fragmentary sectional view through the safety means and associated parts.

Fig. 3 is an enlarged perspective view of the safety means with the parts thereof shown in separated juxtaposition.

Referring to the drawing by characters of reference, the control device by way of illustration of the invention includes a valve casing 10 providing an elongated mixing chamber 11 which communicates at one end thereof with hot and cold water inlets 12 and 13 through aligned valve ports 14 and 15, and 16 and 17 respectively for mixing or blending the same in the mixing chamber, the mixed water therein being discharged through the discharge outlet 18.

The valve ports 14 and 15, and 16 and 17 are formed in opposite walls of oppositely directed partitions 19 and 20 which extend inwardly from and in surrounding relation with the inlets 12 and 13 respectively and which together with the valve casing 10 define a reversely curved passageway 21 into which the valve ports open.

The admission of hot and cold water into the mixing chamber is regulated by valve disks 22, 23 and 24 mounted on a reciprocatory valve stem 25 for movement of the double faced disk 23 toward and away from the valve ports 15 and 16, for movement of the disk 22 toward and away from the valve port 14 and for movement of the disk 24 toward and away from the valve port 17. The outer free end of the valve stem 25 is guidedly mounted in an opening in a removable plug 27 threadedly engaging in a valve cap 28 and interposed between the headed end of the stem and the inner end of the bore in said cap is an expansion spring 29 functioning normally to move the valve disks 22 and 23 away from the hot water ports 14 and 15 respectively and the valve disks 23 and 24 toward the cold water ports 16 and 17 respectively.

In order automatically to regulate the flow of the hot and cold water through said ports into the mixing chamber in accordance with the requirement for hot water at a predetermined temperature to be delivered through said outlet 18, a thermostatic element 30 is provided which is disposed in the mixing chamber and includes a tubular shell 31 containing a piston 32 secured to a head 33 which closes the free end of an expansible and contractible tube 34 secured at its opposite end to the apertured end of the tubular shell 31 through which the free end of the piston 32 protrudes into engagement with the stem 25. The shell 31 contains a thermosensitive liquid in surrounding relation with the tube 34 adapted upon increase temperature of the water in the mixing chamber to effect movement of the piston 32 and the valve stem 25 in a direction opposite to that hereinbefore described and opposed to the spring 29. Upon decrease of the temperature of the water in the mixing chamber the thermosensitive liquid will contract to permit the spring 29 to move the valve stem as described.

The thermostatic element 30 is adjustable longitudinally of the mixing chamber or toward and away from the valve ports so as to vary the predetermined temperature of the mixed water to be discharged from the mixing chamber, by means of a set screw 36 threadedly engaging a screw cap 37 fitted in the lower open end of the casing 10.

Interposed between the inner end of the set screw 36 and the adjacent end of the thermostatic element 30 in end to end relation and in axial alignment therewith is a safety device 38 and a relief element 39.

The safety device 38 consists of inner and outer telescopically associated tubular sections 40 and 41 having open inner ends and outer ends formed with inwardly directed flanges 42 defining shoulders or stops. Disposed within the inner section 41 is an expansion spring 43 engaging at its opposite ends against suitable retaining means such as bearing disks 44 and 45 and which bearing disks are seated against the shoulders defined by the flanges 42 of the sections respectively. The sections are retained in nested telescopically associated relation and under tension of the spring 43 by fusible metal plugs 46 composed of bismuth, lead and tin or any suitable alloy and which are fused to the edges of the openings 47 in the outer section 41 and to the outer face of the inner section 40. The normal tension of the spring 43 is in excess of the tension of the spring 29 so that in the event that the mixed water in the mixing chamber reaches a dangerous temperature or a higher temperature than that desired due to the failure of the thermostatic element 30 to function properly the fusible metal plugs will be melted by the heat of the mixed water to permit the spring 43 to move the inner section 40 outwardly and toward the valve ports, as illustrated in Figure 2 of the drawing, thus moving the thermostatic element and the valve stem 25 to close the hot water ports.

The safety device is slidable in a tubular sleeve 48 so as to dispose the opposite ends thereof in engagement against the relief element 39 and the thermostatic element 30. The sleeve 48 is slidably fitted over the inner end of the thermostatic element and is retained thereon for limited axial sliding movement by a slot and pin connection 49 and 50 respectively provided on the thermostatic element and the sleeve.

The relief element 39 includes a tubular shell 51 having inwardly directed annular flanges 52 and 53 at the opposite ends thereof providing shoulders for bearing disks 54 and 55 normally maintained thereagainst by a relief spring 56 which is disposed within the shell between said disks and the tension of which spring 56 is in excess of the tension of the spring 29. The tubular shell 51 is welded or otherwise fixed to the sleeve 48 to thereby maintain the relief spring 56 in axial alignment with the thermostatic element 30 and the safety device 38 so that the relief spring will be compressed and take up any excess expansion of the thermostatic element in event the same should continue to expand after the valve disks 22 and 23 are seated to close the valve ports 14 and 15. When the relief spring is thus compressed, the outer disk 54, which is threadedly engaged by the inner end section of the set screw 36, will be moved inwardly, while the shell 51, the safety device 38 and the tubular shell 31 of the thermostatic element 30 will be moved in the opposite direction.

It will thus be seen that a thermo-sensitive safety device is provided in a thermostatically controlled valve for supplying hot water, which device functions to shut off the supply of hot water in the event that the thermostatic element fails to function and the hot water in the mixing chamber reaches a dangerous temperature or a temperature higher than that desired. Furthermore, a relief element is provided which functions to prevent rupture of the thermostatic element in event the same should continue to expand after the hot water or steam inlets are closed.

What is claimed is:

1. In a thermostatically controlled device for supplying hot water, a valve casing providing an elongated mixing chamber and having aligned valve ports opening into the mixing chamber and inlet openings for admitting into the mixing chamber through said ports hot fluid and relatively colder water respectively, a reciprocatory valve stem having valve disks movable toward and away from said ports for opening and closing the same, an expansion spring engaging said valve stem for normally moving the same in one direction, a thermostatic element located in the mixing chamber and engaging the valve stem for moving the same in the opposite direction and against the tension of said spring, and a safety device located in said mixing chamber and including inner and outer telescopically associated tubular sections, said outer section having an opening in the wall thereof, an expansion spring disposed in said inner section and tensioned against the outer ends of the inner and outer sections respectively and a plug fused in said opening in the outer section and fused to the outer face of the inner section for securing the sections together and functioning upon melting of the said plug by the heat of the water in the mixing chamber to permit said last mentioned spring to move the sections of said safety device relative to each other thereby moving said thermostatic element and the valve stem axially of the mixing chamber to close the hot fluid port.

2. In a thermostatically controlled device for supplying hot water, a valve casing providing an elongated mixing chamber and having aligned valve ports opening into the mixing chamber and inlet openings for admitting into the mixing chamber through said ports hot fluid and relatively colder water respectively, a reciprocatory valve stem having valve disks movable toward and away from said ports for opening and closing the same, an expansion spring engaging said valve stem for normally moving the same in one direction, a thermostatic element located in the mixing chamber and engaging the valve stem for moving the same in the opposite direction and against the tension of said spring, and a safety device located in the mixing chamber and including inner and outer telescopically associated tubular sections each having an open end and an abutment at the opposite end, one of said sections having an opening in the wall thereof, an expansion spring disposed in said inner section and tensioned against the abutments respectively and a fusible plug disposed in said opening in one of said sections and fused to the adjacent face of the other section for securing the sections together under tension of said spring and functioning upon melting of said plug by the heat of the water in the mixing chamber to permit said last mentioned spring to move the sections relative to each other thereby moving said thermostatic element and the valve stem axially of the mixing chamber to effect the closing of the hot fluid port.

3. In a thermostatically controlled device including a valve and a thermostat for actuating the same, an auxiliary thermo-sensitive safety means operable upon failure of the thermostat to actuate said valve and consisting of a longitudinally extensible member composed of mating telescopically associated tubular sections one of which is provided with an opening, an internal abutment at one end of each section the abutment of one section being disposed at the end opposite to that of the other section, a coiled expansion spring housed by said sections with the opposite ends thereof engaging the abutments, and a fusible plug arranged in the radial opening of said one section and fused to the wall of the other section to hold the spring normally under tension.

4. In a thermostatically controlled device including a valve and a thermostat for actuating the same, an auxiliary thermo-sensitive safety means operable upon failure of the thermostat to actuate said valve and consisting of a pair of inner and outer telescopically associated tubular sections each having an inwardly directed annular flange at one end thereof with the flange of one section being disposed at the end opposite to the flanged end of the other section, a retaining member within each section abutting the flange, a coiled expansion spring located within the sections and having its opposite ends engaging the retaining means, one of said sections having a radial opening and a fusible plug arranged in said opening and fused to the wall of the other section for normally holding the spring under tension and the sections in predetermined telescopically associated relation for release and longitudinal extension when the fusible plug is melted thereby moving the thermostat to effect closing of the valve.

5. In a thermostatically controlled device for supplying hot water, a valve casing providing an elongated mixing chamber and having aligned valve ports opening into the mixing chamber and inlet openings for admitting into the mixing chamber through said ports hot fluid and relatively colder water respectively, a reciprocatory valve stem having valve disks movable toward and away from said ports for opening and closing the same, an expansion spring engaging said valve stem for normally moving the same in one direction, a thermostatic element located in the mixing chamber and engaging the valve stem for moving the same in the opposite direction and against the tension of said spring, a longitudinally extensible safety device arranged in said mixing chamber in axial alignment with said thermostatic element and held in normally contracted relation by a fusible connection and functioning upon the fusing of said connection by the heat of the water in the mixing chamber to axially extend and move said thermostatic element and the valve stem to effect the closing of the hot fluid port, and a relief element arranged in said mixing chamber and having an inwardly compressible relief spring disposed in axial alignment with said thermostatic element and said safety device and functioning to take up excess expansion of the thermostatic element by the compression of said spring in the event that the thermostatic element continues to expand after the valve stem has been moved to effect the closing of the hot fluid supply and a sleeve affixed to said relief element in surrounding relation therewith and slidably fitted at one end over the inner end of the thermostatic element and slidably containing the said safety device between the thermostatic element and the relief device for retaining said safety device and relief element in axial alignment with said thermostatic element.

HERBERT J. C. WELLS.